United States Patent [19]

Bond et al.

[11] Patent Number: 4,617,692
[45] Date of Patent: Oct. 21, 1986

[54] TOOL FOR DRILLING AND SECURING SCREW ANCHOR TO A WALL

[75] Inventors: Michael E. Bond, Topton; Robert S. Noll, Reading, both of Pa.

[73] Assignee: Emhart Corporation, Farmington, Conn.

[21] Appl. No.: 567,255

[22] Filed: Dec. 30, 1983

[51] Int. Cl.⁴ .................... B26B 11/00; F16B 13/04
[52] U.S. Cl. ............................. 7/158; 7/165; 408/241 R; 411/29; 411/387; 411/397; 411/908
[58] Field of Search ............... 408/226, 241 R; 411/370, 377, 396, 401, 29-31, 387, 397, 900, 904, 908; 7/165, 158; 72/114; 81/459

[56] References Cited

U.S. PATENT DOCUMENTS

| | | | |
|---|---|---|---|
| 756,339 | 4/1904 | Down | 408/233 |
| 2,367,841 | 1/1945 | Monroe | 407/54 |
| 3,316,796 | 5/1967 | Young | 411/29 |
| 3,437,004 | 4/1969 | Pacharis | 411/29 |
| 4,245,545 | 1/1981 | Freeman | 411/29 X |
| 4,447,923 | 5/1984 | Bond et al. | 7/165 |
| 4,507,817 | 4/1985 | Staffeld | 7/165 X |

Primary Examiner—Gil Weidenfeld
Assistant Examiner—Steven C. Bishop
Attorney, Agent, or Firm—William F. White

[57] ABSTRACT

A tool is disclosed for both drilling a hole and thereafter securing a screw anchor therein in a quick and expeditious manner. The tool comprises a handle with a threaded stem extending therefrom. The threaded stem allows a screw anchor and a hard plastic drill tip to be threadably mounted thereon. The tool facilates the manual application of sufficient drilling pressure to the thus mounted drill tip so as to form the appropriately sized hole for the screw anchor.

5 Claims, 6 Drawing Figures

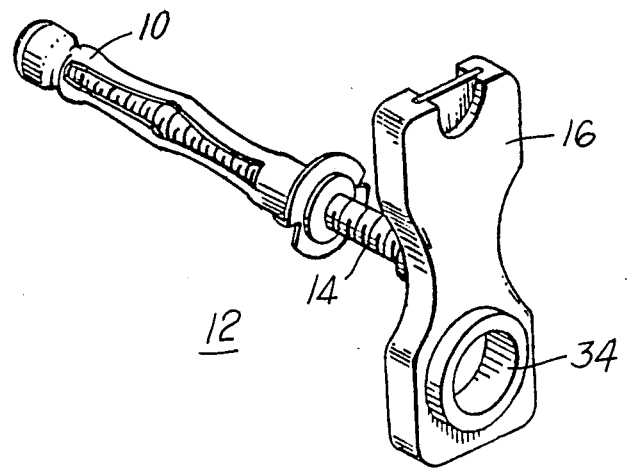
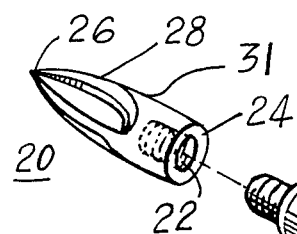
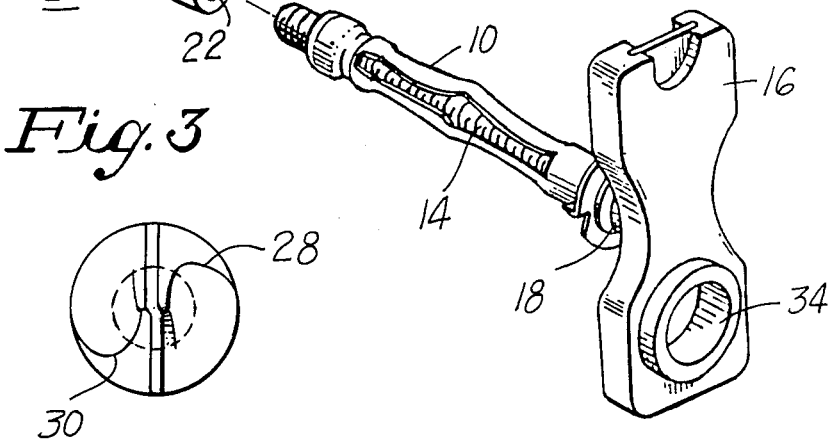

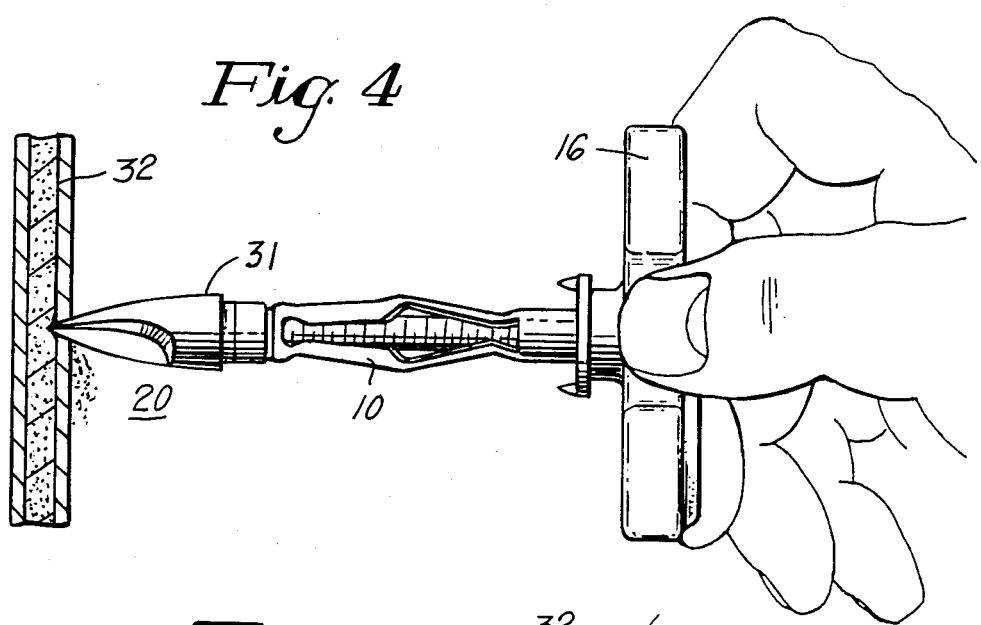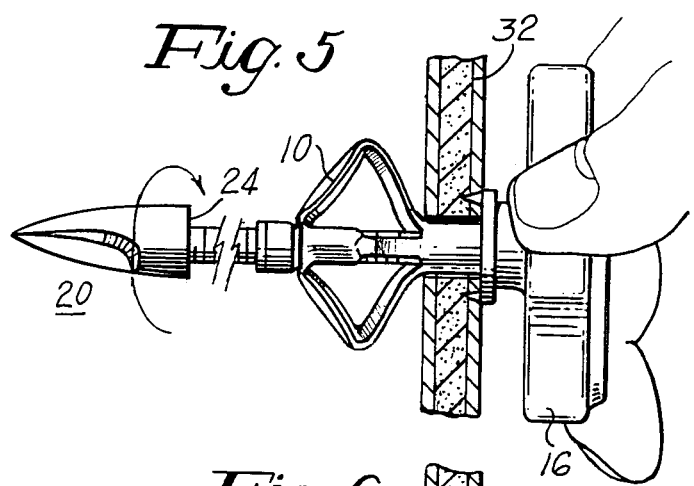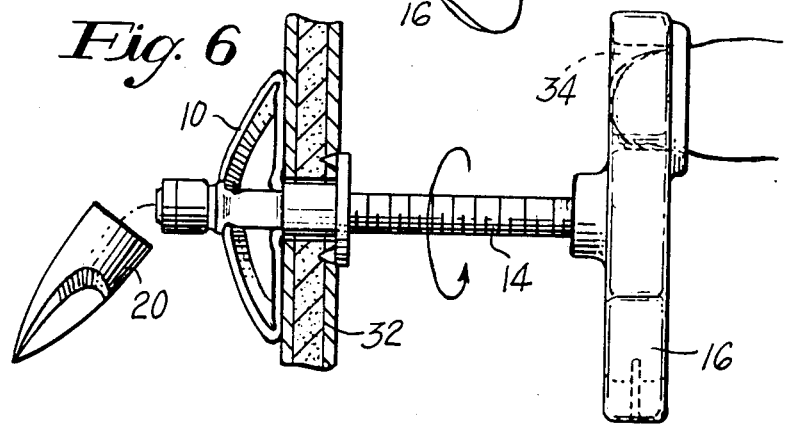

TOOL FOR DRILLING AND SECURING SCREW ANCHOR TO A WALL

FIELD OF THE INVENTION

This invention relates to the manner in which a screw anchor is secured to a wall. In particular, the invention relates to a tool which facilitates both the preparation of the wall for receipt of the anchor as well as the securing of the screw anchor to the wall.

BACKGROUND OF THE INVENTION

U.S. Pat. No. 4,447,923, filed on Dec. 30, 1981; in the names of Michael E. Bond and Harry E. Taylor discloses a particular tool for setting a screw anchor in a wall. The disclosed tool will set a screw anchor within an appropriately pre-drilled hole in the wall in a very quick and reliable manner. In this regard, the tool has a configuration which allows for the manual application of two distinct levels of torque to a screw anchor that has been inserted into the hole. The first level of torque breaks down the inserted screw anchor whereas the second level of torque completes the setting of the screw anchor. It is however to be appreciated that a hole must first be made in the wall prior to the insertion and setting of the screw anchor. The hole in the wall is normally made by either a manual or an electrical drill. This means that at least one tool is needed in addition to the disclosed tool in U.S. Pat. No. 4,447,923. In the case of an electrical drill, electrical power will also be needed.

The particular drill will also require an appropriately selected drill bit that forms the correct hole size in the wall for the screw anchor. The selection of an appropriately sized drill bit is often a trial and error proposition for one not familiar with matching hole sizes to screw anchors. In this regard, if the hole is undersized, then the screw anchor might be damaged when it is forced into the hole. On the other hand, if the hole is too large, then the screw anchor might not be appropriately set to the blind side of the wall.

OBJECTS OF THE INVENTION

It is an object of the invention to provide a tool which drills a hole in the wall and thereafter sets the screw-anchor within the thus drilled hole.

It is another object of the invention to provide a tool which drills an appropriately sized hole in the wall for the particular screw anchor that is to be inserted therein and set by the same tool.

SUMMARY OF THE INVENTION

The above and other objects are achieved according to the present invention by providing a drill tip that can be easily mounted onto the end of the setting tool disclosed in U.S. Pat. No. 4,447,923. In this regard, the disclosed setting tool of the aforementioned U.S. patent includes a threaded stem to which a screw anchor can be threadably mounted thereon. In accordance with the invention, the drill tip is threaded onto the remaining portion of the threaded stem following the mounting of the screw anchor. The drill tip is preferably fabricated of a hard plastic with sufficient hardness to allow for drilling into wallboard. The drill tip furthermore preferably includes internal threads which facilitate a threadable engagement with the stem of the setting tool.

DESCRIPTION OF THE DRAWINGS

The above and other features of the invention will now be particularly described with reference to the accompanying drawings, in which:

FIG. 1 is an overall perspective view of a setting tool together with a screw anchor that is being mounted thereon;

FIG. 2 illustrates the mounting of a drill tip onto the end of the setting tool having a screw anchor fully mounted thereon;

FIG. 3 is an end view of the drill tip illustrated in FIG. 2; and

FIGS. 4 through 6 illustrate the use of the setting tool with the drill tip and screw anchor mounted thereon.

DESCRIPTION OF THE PREFERRED EMBODIMENT

Referring to FIG. 1, a screw anchor 10 is illustrated as having been partially mounted onto a tool 12. In particular the screw anchor 10 is seen to be partially mounted onto a threaded stem 14 of the tool. The threaded stem 14 extends from the underside of a contoured handle 16. The contoured handle 16 is preferably a molded plastic handle and the threaded stem 14 is preferably a bolt partially encapsulated within the handle. It is to be appreciated that the handle 16 is rigidly affixed to the stem 14 by virtue of the aforementioned encapsulation. The structural relationship of the stem 14 and the handle 16 as well as other details of the tool 12 are further discussed in U.S. Pat. No. 4,447,923 which is incorporated herein by reference.

Referring now to FIG. 2, the screw anchor 10 is seen to be completely mounted onto the threaded stem 14. In this regard, the head of the screw anchor now abuts a neck portion 18 of the plastic handle. The neck portion 18 is formed on the underside of the plastic handle and extends axially down the stem 14 for a short distance which is preferably 0.250 inches. This allows the head of the screw anchor to firmly abut only a portion of the handle.

In accordance with the invention the stem 14 must allow for the complete threading of the screw anchor 10 thereon. In this regard, a particular size of screw anchor is normally manufactured to a predetermined length so as to thereby define the necessary length of the stem 14 for that size of screw anchor. The length of the stem must also allow at least two threads to be exposed beyond the end of the thus mounted screw anchor. A drill tip 20 is now threaded onto these exposed threads. To facilitate this threading, the drill tip 20 preferably has a hole 22 therein which is tapped to the thread size of the stem 14. The depth of the tapped hole 22 is sufficient to completely engage all exposed threads at the end of the stem 14. This allows the end surface 24 of the drill tip to firmly abutt the end of the screw anchor 10 when it has been completely threaded onto the stem 14.

The drill tip 20 is preferably fabricated from a hard plastic such as acrylonitrile butadiene styrene (ABS), Delrin or Nylon. Each of these hard plastics is available from the E.I. Dupont Company. The configuration of the thus fabricated drill tip is seen to begin with a formed point 26 sufficient to permit penetration of conventional wallboard materials. Such conventional wallboard materials would include sheetrock, gypsum board and plaster board. The drill tip further comprises a pair of relieved flute sections 28 and 30 which cut through and remove the wall board material. FIG. 3 is an end view of the drill tip 20 which illustrates both flute sections 28 and 30. It is to be noted that the flute sections inclusive of the point 26 are approximately 0.625 inches long so as to thereby define an appropriate drilling length. The rear, unfluted, cylindrical portion 31 of the drill tip is approximately 0.250 inches in length.

Referring now to FIG. 4, the drill tip 20 is illustrated in mounted fashion on the threaded stem 14. In this regard, the rear surface 24 of the drill tip abuts the end of the screw anchor 10. The drill tip's threaded engagement with the stem 14 together with the aforementioned abutment creates an appropriate rigidity for applying drilling pressure to a wall board 32. It is to be noted that drilling pressure is applied by grasping the contoured handle 16 between the thumb and index finger. This drilling pressure has caused an initial penetration of the wall board 32 in FIG. 4. It is to be noted that the length and taper of the fluted portion of the drill tip is sufficient to allow for a gradually increased drilling of the wall board 32. In this regard, the tapered angle of the drill tip is approximately twenty degrees with respect to the central axis of the drill tip. The hole which is thereby defined in the wall board 32 has a diameter equal to the diameter of the unfluted, cylindrical rear portion of the drill tip. This hole size is sufficient to accommodate the largest diameter of the screw anchor 10 which normally occurs at the knees of the legs of the screw anchor. In other words, the diameter for the rear cylindrical portion of this drill tip must be substantially equal to the largest diameter of the screw anchor for which it is intended.

Referring now to FIG. 5, the screw anchor 10 has been fully inserted into the hole formed in the wall board 32. The screw anchor has moreover been initially broken down by the application of a breakdown torque. The breakdown torque is applied in much the same manner as the drilling pressure was in FIG. 4. Specifically, the handle 16 is firmly held between the thumb and index finger and thereafter rotated. As can be seen, the threaded end of the screw anchor 10 has drawn away from the rear surface 24 of the drill tip 20 following the breakdown of the anchor. The screw anchor 10 is now preferably set against the wall board 32 by inserting one's index finger into a hole 34 provided at one end of the handle 16 and thereafter rotating the handle 16 in a quick and continuous manner. This is not particulaly shown in the present drawings. It is however to be appreciated that both the breaking down action and the final setting of the screw anchor by the tool 12 is fully disclosed in U.S. Pat. No. 4,447,923.

Referring now to FIG. 6, the screw anchor 10 has been completely set against the blind side of the wallboard 32. The tool 12 is being disengaged from the screw anchor 10 by rotating the tool 12 in an opposite direction to that required for setting the screw anchor. This is preferably accomplished by inserting one's index finger into the hole 34 and quickly rotating the handle 16. This ultimately results in the drill tip 20 becoming disengaged from the end of the threaded stem 14. The drill tip 20 is simply discarded behind the wallboard 32 when this latter event occurs as illustrated in FIG. 6.

It is to be noted that the drill tip 20 need not be lost behind the wallboard 32 in the manner illustrated in FIG. 6. Specifically, the drill tip 20 may be reused simply by removing the same from the end of the setting tool 12 following the drilling of the hole illustrated in FIG. 4. In this manner, the drill tip can be reused many times for drilling the appropriately sized hole for the particular size of screw anchor that is to be inserted therein. In this regard, the drill tip 20 may be supplied with a given number of screw anchors of the same size. This will allow each of these screw anchors to be mounted on the setting tool 12 together with the drill tip 20. In this manner, the appropriately sized hole for each screw anchor is drilled into the wallboard 32 without need to experiment or otherwise spend time resolving which size hole should be drilled.

From the foregoing, it is to be appreciated that a preferred embodiment has been disclosed for a tool which both drills a hole and subsequently sets a screw anchor within the hole. It should be understood that various heretofore described features of this tool may be varied without departing from the scope of the present invention.

What is claimed is:

1. A tool for preparing a hole in a wall for receipt of a screw anchor that is to be secured to the wall by the same tool, said tool comprising:

a handle with a threaded stem extending therefrom, said threaded stem having a length sufficient to allow a screw anchor to be threadably mounted thereon whereby at least two threads of the threaded stem are exposed beyond the end of the thus mounted screw anchor; and an integrally formed drill tip having a point and a tapered drilling length extending back from said point, said integrally formed drill tip furthermore having a tapped hole extending along the central axis of the drill tip, said tapped hole having threads therein which match the exposed threads on said threaded stem, said tapped hole furthermore being of sufficient depth so as to allow said drill tip to abut the end of a screw anchor threadably mounted on said threaded stem when said drill tip is threaded onto the exposed threads of said threaded stem, the abutment only being maintained when the drill tip is rotated in a drilling direction so as to drill a hole into a wall structure so as to form a hole for the screw anchor.

2. The tool of claim 1 wherein said drill tip further comprises:

a cylindrical portion extending rearwardly of said drilling length, said cylindrical portion having a sufficient diameter so as to substantially abut the end of a screw anchor threadably mounted on said threaded stem and to thereby allow sufficient torque to be transmitted to the drilling length of said drill tip.

3. The tool of claim 2 wherein the outside diameter of said cylindrical portion of said drill tip is substantially equal to the largest outside diameter of the mounted screw anchor.

4. The tool of claim 1 wherein said drill tip is fabricated from a hard plastic having a sufficient hardness to drill through wallboard material.

5. The tool of claim 1 wherein said handle has a contour which facilitates the grasping thereof in a manner which allows sufficient drilling pressure to be applied to the wallboard.

* * * * *